United States Patent
Periyalwar et al.

(10) Patent No.: US 10,212,558 B2
(45) Date of Patent: Feb. 19, 2019

(54) SYSTEMS AND METHODS FOR DISTRIBUTING CONTENT IN WIRELESS NETWORKS

(71) Applicant: BlackBerry Limited, Waterloo (CA)

(72) Inventors: Shalini Suresh Periyalwar, Waterloo (CA); William Anthony Gage, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 108 days.

(21) Appl. No.: 14/726,032

(22) Filed: May 29, 2015

(65) Prior Publication Data
US 2015/0373634 A1     Dec. 24, 2015

Related U.S. Application Data

(63) Continuation of application No. 11/718,006, filed as application No. PCT/IB2005/003883 on Dec. 23, 2005, now abandoned.
(Continued)

(51) Int. Cl.
*H04W 4/06* (2009.01)
*H04W 48/18* (2009.01)
(Continued)

(52) U.S. Cl.
CPC ............ *H04W 4/06* (2013.01); *H04W 48/18* (2013.01); *H04L 12/189* (2013.01); *H04W 88/02* (2013.01)

(58) Field of Classification Search
CPC ..................................................... H04W 4/06
See application file for complete search history.

(56) References Cited

U.S. PATENT DOCUMENTS 7,046,998 B2     5/2006  Verma et al.
7,295,568 B2 *  11/2007  Kossi .................. H04L 63/0428
                                                              370/270
(Continued)

FOREIGN PATENT DOCUMENTS

WO     2003/084261     10/2003
WO     2004/039117      5/2004
(Continued)

OTHER PUBLICATIONS

International Preliminary Report on Patentability in International Application No. PCT/IB2005/003883, dated Jul. 10, 2007, 8 pages.
(Continued)

*Primary Examiner* — Jason E Mattis
(74) *Attorney, Agent, or Firm* — Fish & Richardson P.C.

(57) ABSTRACT

The present invention allows content to be delivered to a mobile terminal over different types of networks in order to efficiently use network resources. Content can be delivered using a select delivery method over a cellular network, a local wireless network, or a broadcast network. Within any of the networks, the content may be unicast to individual mobile terminals using individual content flows, multicast to a group of mobile terminals, or broadcast to any or all of the mobile terminals. Content can be multicast or broadcast to mobile terminals via different ones of the disparate networks. During a content flow, the network through which the content flow is delivered may be changed to allow the mobile terminal to receive the content through a different network. Further, the delivery method used to deliver the content may dynamically change as the number of mobile terminals receiving or requesting the content changes.

17 Claims, 18 Drawing Sheets

Related U.S. Application Data

(60) Provisional application No. 60/641,756, filed on Jan. 7, 2005.

(51) Int. Cl.
*H04L 12/18* (2006.01)
*H04W 88/02* (2009.01)

(56) References Cited

U.S. PATENT DOCUMENTS

| | | | |
|---|---|---|---|
| 7,453,831 B2 * | 11/2008 | Dorenbosch | H04L 12/189 370/270 |
| 2005/0025164 A1 | 2/2005 | Kavanagh et al. | |
| 2005/0239498 A1 | 10/2005 | Dorenbosch et al. | |
| 2006/0002054 A1 | 1/2006 | Lipsanen | |
| 2006/0020547 A1 * | 1/2006 | Lipsanen | H04N 7/17336 705/51 |
| 2006/0056448 A1 | 3/2006 | Zaki et al. | |
| 2006/0126565 A1 | 6/2006 | Shaheen | |
| 2007/0058626 A1 * | 3/2007 | Keller | H04L 12/189 370/390 |
| 2007/0136759 A1 | 6/2007 | Zhang et al. | |

FOREIGN PATENT DOCUMENTS

| | | |
|---|---|---|
| WO | 2004/040876 | 5/2004 |
| WO | 2004/062114 | 7/2004 |
| WO | 2004/071125 | 8/2004 |

OTHER PUBLICATIONS

International Search Report in International Application No. PCT/IB2005/003883, dated Apr. 28, 2006.

International Written Opinion in International Application No. PCT/IB2005/003883, dated Apr. 28, 2006, 7 pages.

* cited by examiner

42 ——— BROADCAST ZONE (1)
30 ——— CELLULAR ZONE (7)
32 - - - - LOCAL WIRELESS ZONE (12)

DELIVERY AREA
42 ——— BROADCAST ZONE (1)
30 ——— CELLULAR ZONE (7)
32 - - - - - LOCAL WIRELESS ZONE (12)

DELIVERY AREA
42 ━━━━ BROADCAST ZONE (1)
30 ──── CELLULAR ZONE (7)
32 ------ LOCAL WIRELESS ZONE (12)

///// DELIVERY AREA
42 ━━━ BROADCAST ZONE (1)
30 ─── CELLULAR ZONE (7)
32 ------ LOCAL WIRELESS ZONE (12)

SYSTEMS AND METHODS FOR DISTRIBUTING CONTENT IN WIRELESS NETWORKS

CROSS-REFERENCE TO RELATED APPLICATION

This application is a continuation of and claims the benefit of U.S. patent application Ser. No. 11/718,006, filed on Mar. 3, 2008 that is a National Phase Entry of International Application Number PCT/IB2005/003883 filed Dec. 23, 2005, and claims the benefit of U.S. Provisional Patent Application Ser. No. 60/641,756, filed on Jan. 7, 2005, the entire content of the forgoing applications are incorporated herein by reference.

FIELD OF THE INVENTION

The present invention relates to wireless communications, and in particular to distributing different types of content via different types of networks.

BACKGROUND OF THE INVENTION

Mobile communications have evolved to a point where broadband services are available through traditional cellular networks as well as through local wireless networks, such as those supported by the IEEE 802.11 standards for local wireless area networks and Bluetooth standards. Although local wireless access generally supports higher data rates, cellular coverage is much more pervasive. Further, local wireless access is readily made available in areas where cellular access may not be available, such as in buildings or the like. In other areas, local wireless access and cellular access may be available at the same time. For the most efficient use of communication resources, it would be preferable to use local wireless access if possible to conserve cellular resources. Given the complementary nature of cellular and local wireless access, mobile terminals are being developed to support voice and broadband services over both cellular and local wireless networks.

There is a new trend toward providing high quality digital audio and video content to large numbers of mobile terminals. Certain types of content need to be made available to very large numbers of mobile terminals, wherein other types of content need to be sent to relatively large groups of users at any given time. For on-demand content, only one or a few mobile terminals may need certain content at any given time. Accordingly, there is a need for unicast, multicast, and broadcast delivery of content to mobile terminals. In current third generation standards proposals, multicast and broadcast content flows are broken into unicast streams in a cellular network and delivered to mobile terminals in individual content flows. Transmitting large numbers of redundant content flows through cellular network is very inefficient, and most cellular networks would not be able to support large numbers of high-quality video sessions.

In an effort to avoid the inefficiencies of the third generation proposals, the use of a licensed or leased broadcast channel for delivering multicast and broadcast messages to cellular users has been discussed. However, the limited number of available channels and the lack of a feedback or signaling channel limits the ability to distribute select content to smaller groups of mobile terminals. Further information may be reviewed in the Digital Video Broadcasting for Handheld (DVBH) and MediaFLO™ proposals. Unfortunately, these proposals are greatly limited in their ability to optimize resource use and offer the flexibility to provide various types of content and qualities of content to different groups of mobile terminals. Further, these standards fail to take into consideration the integration of cellular and local wireless communications.

Accordingly, there is a need for an improved technique for distributing content among mobile terminals through disparate networks in an efficient and effective manner.

SUMMARY OF THE INVENTION

The present invention allows content to be delivered to a mobile terminal over different types of networks in order to efficiently use network resources. In particular, content can be delivered using a select delivery method over a cellular network, a local wireless network, or a broadcast network. For cellular and local wireless networks, content can be delivered throughout the network or to one or more select zones, such as cells or local wireless zones, or to all or select mobile terminals located within those zones. Within any of the cellular, local wireless, or broadcast networks, the content may be unicast to individual mobile terminals using individual content flows, multicast to a group of mobile terminals, or broadcast to any or all of the mobile terminals. Notably, content can be multicast or broadcast to mobile terminals via different ones of the disparate networks. During a content flow, the network through which the content flow is delivered may be changed to allow the mobile terminal to receive the content through a different network. Further, the delivery method used to deliver the content may dynamically change as the number of mobile terminals receiving or requesting the content changes. Content control and delivery is provided at a network layer or higher, such that disparate networks appear as a common network from an application standpoint.

In one embodiment, a service delivery controller is associated with one or more content providers to effect delivery of content to mobile terminals. Depending on the capabilities of the mobile terminals and the number of mobile terminals requesting or receiving the content, the service delivery controller will determine a delivery method for delivering the content to the mobile terminals, as well as a network or networks through which the content should be routed to reach the mobile terminals. The routing decision may result in one or more content flows through one or more of the disparate networks. Further, the locations of the mobile terminals may result in the content being directed to one or more zones within a given network, or alternatively, broadcast throughout the network or networks.

The service delivery controller will receive information bearing on the capabilities of the mobile terminals, and based on their capabilities and the number of mobile terminals receiving or requesting the content, will create and send network selection indicia and address indicia to the mobile terminals receiving or requesting the content. The network selection indicia corresponds to the network used to deliver the content to the mobile terminal. As such, the mobile terminal can use the network selection indicia to select an appropriate network interface or network through which to receive content. The address indicia corresponds to the delivery method, such as unicast, multicast, or broadcast, and corresponds to an address to which content is directed. The mobile terminals will be able to use the address to identify the content corresponding to a desired content flow. For unicast delivery, the Internet Protocol address for the mobile terminal may be the address to which content is directed. For multicast or broadcast delivery methods, the address indicia will assign a common address to a group of mobile terminals. The address is used by the mobile terminals to recognize content associated with the desired content flow. The service delivery controller may also provide encryption information and the like to assist in content reception.

Prior to the delivery of content, the service delivery controller may receive registration requests from the mobile terminals through the local wireless or cellular networks and register the mobile terminal for each of the cellular, local wireless, and broadcast network in a single registration. The service delivery controller may also validate mobile terminals' subscriber policies to ensure that the mobile terminals have sufficient resource allocations within the appropriate networks, as well as authorization to receive the requested content. Depending on relative service levels, the same content may be delivered in different content flows that have different quality of service levels. The service delivery controller can continuously monitor capabilities of the mobile terminals as the mobile terminals report those capabilities, as well as monitor the number and type of mobile terminals receiving or requesting to receive select content. As these capabilities and numbers change, the service delivery controller can instruct the mobile terminals to change networks, effect delivery of the content through different networks as such changes occur, as well as change delivery methods. Notably, changing delivery methods may change the number of content flows used to deliver the content to the various mobile terminals, change the number of mobile terminals receiving the content, or a combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 5A:
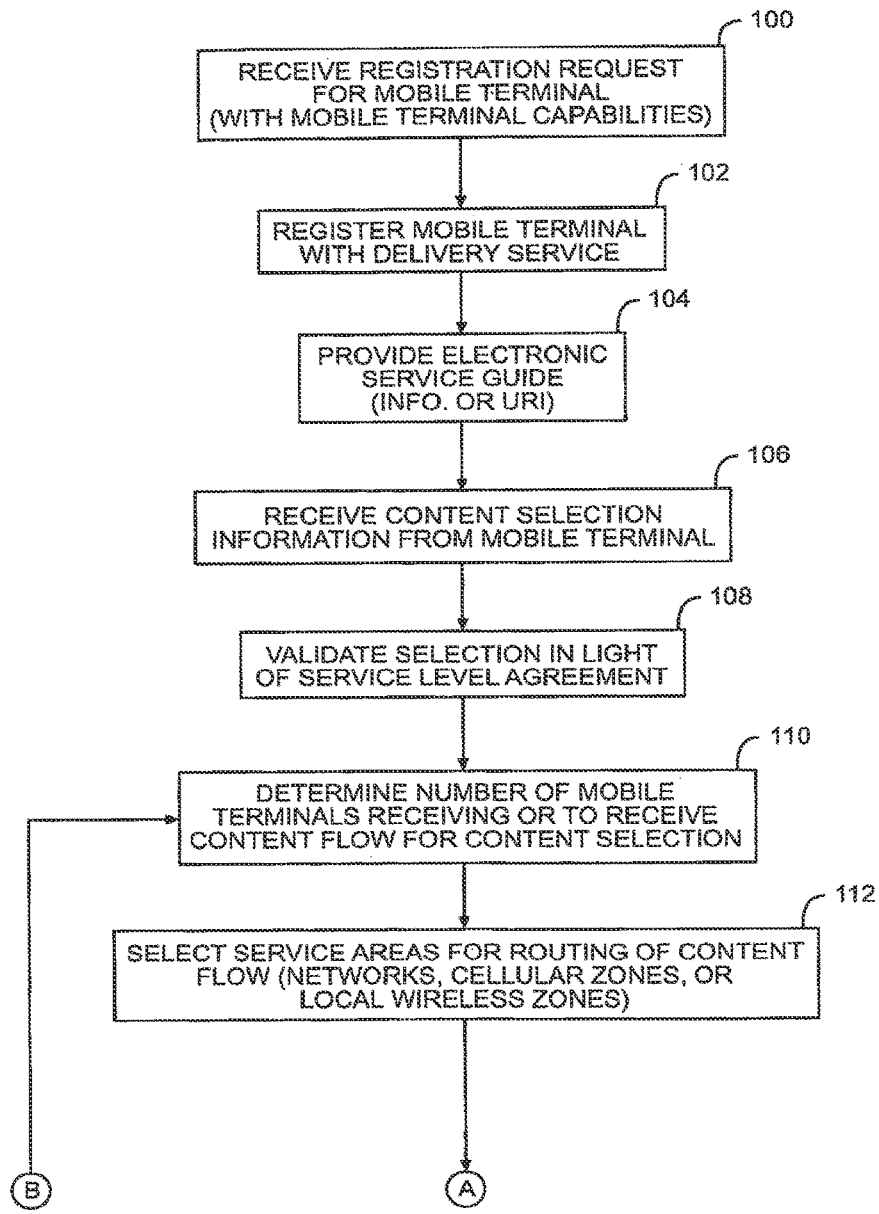
Figure 5B:
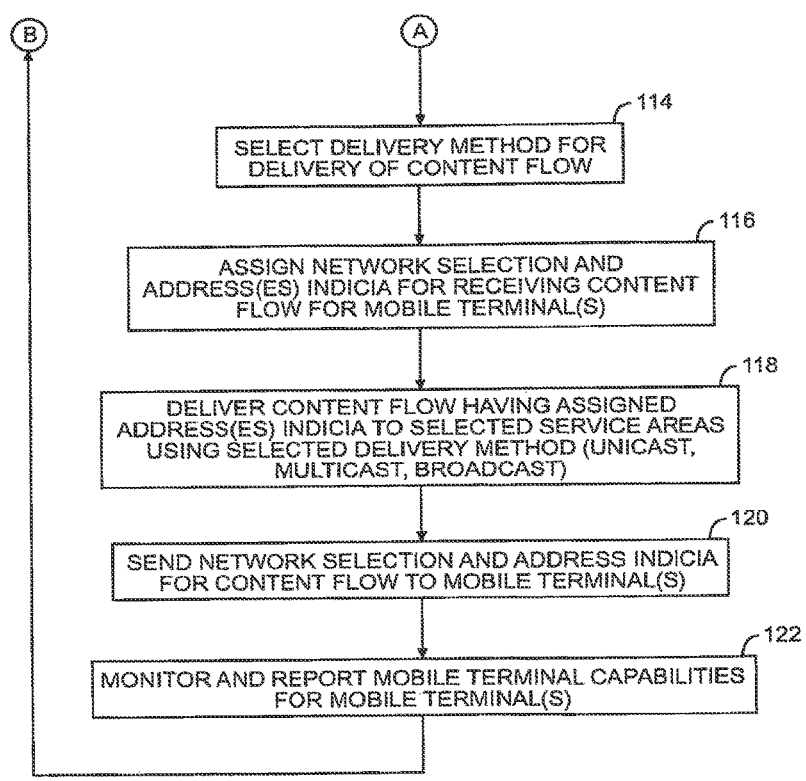

FIGS. 5A and 5B provide a flow diagram illustrating the operation of a service delivery controller according to one embodiment of the present invention.

Figure 6A:
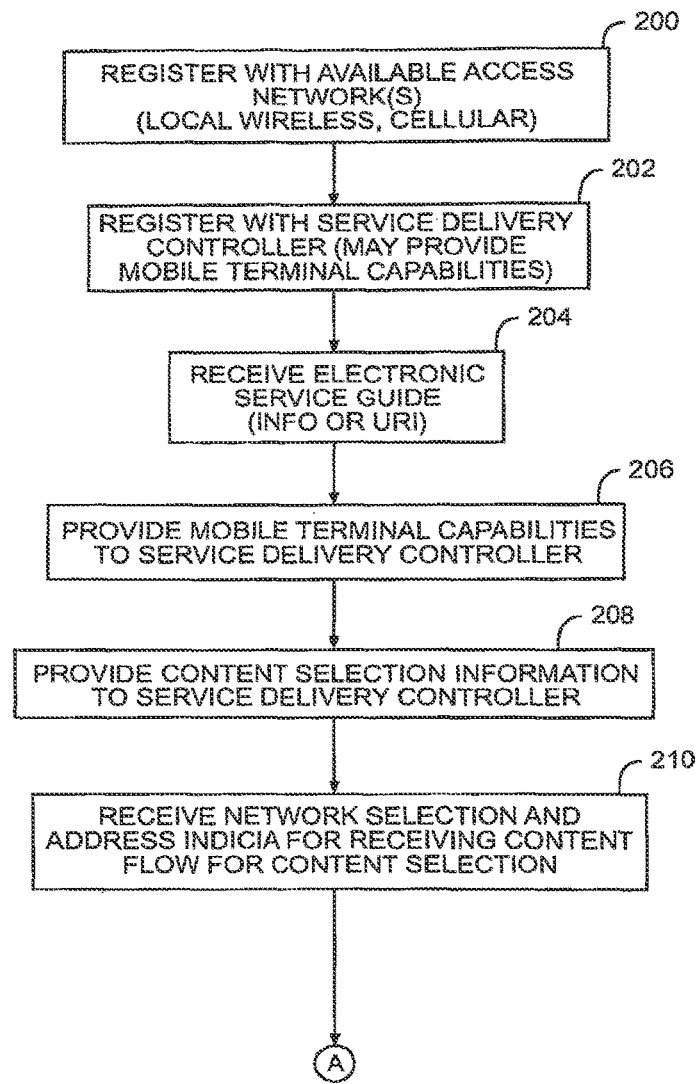
Figure 6B:
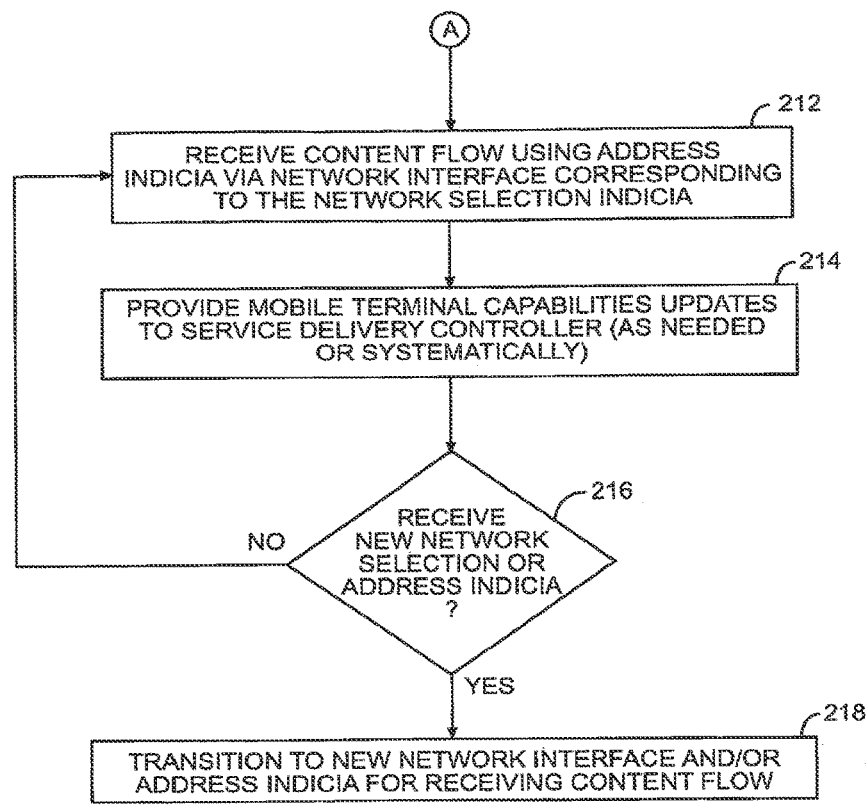

FIGS. 6A and 6B provide a flow diagram illustrating the operation of a mobile terminal according to one embodiment of the present invention.

Figure 7:
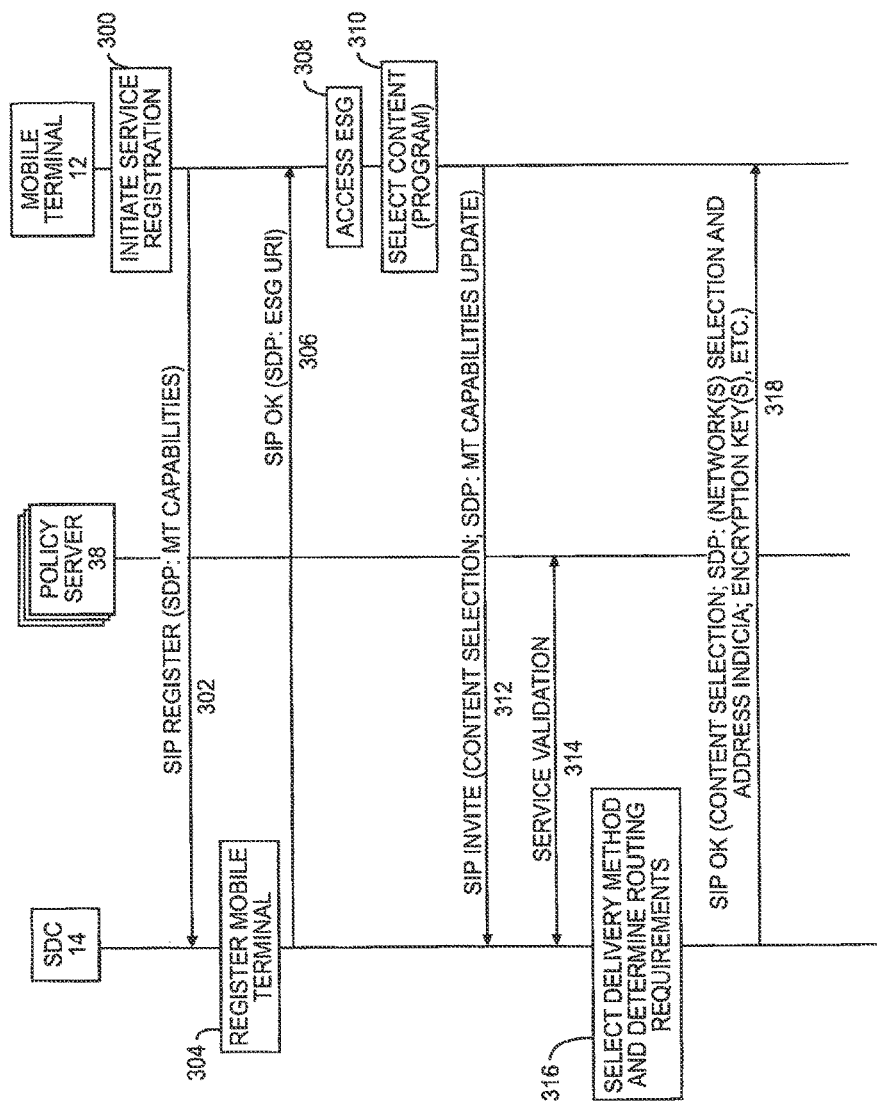

FIG. 7 provides a communication flow for registering and requesting content according to one embodiment of the present invention.

Figure 8:
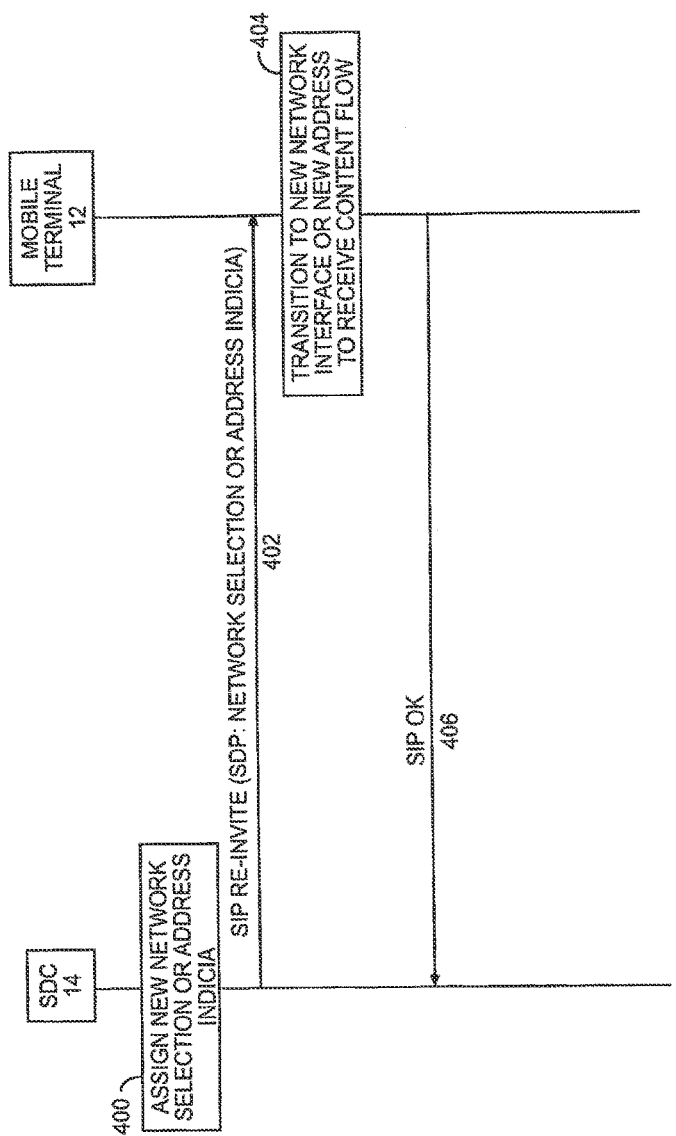

FIG. 8 is a communication flow illustrating the service delivery controller assigning a new service area or address to a mobile terminal according to one embodiment of the present invention.

Figure 9:
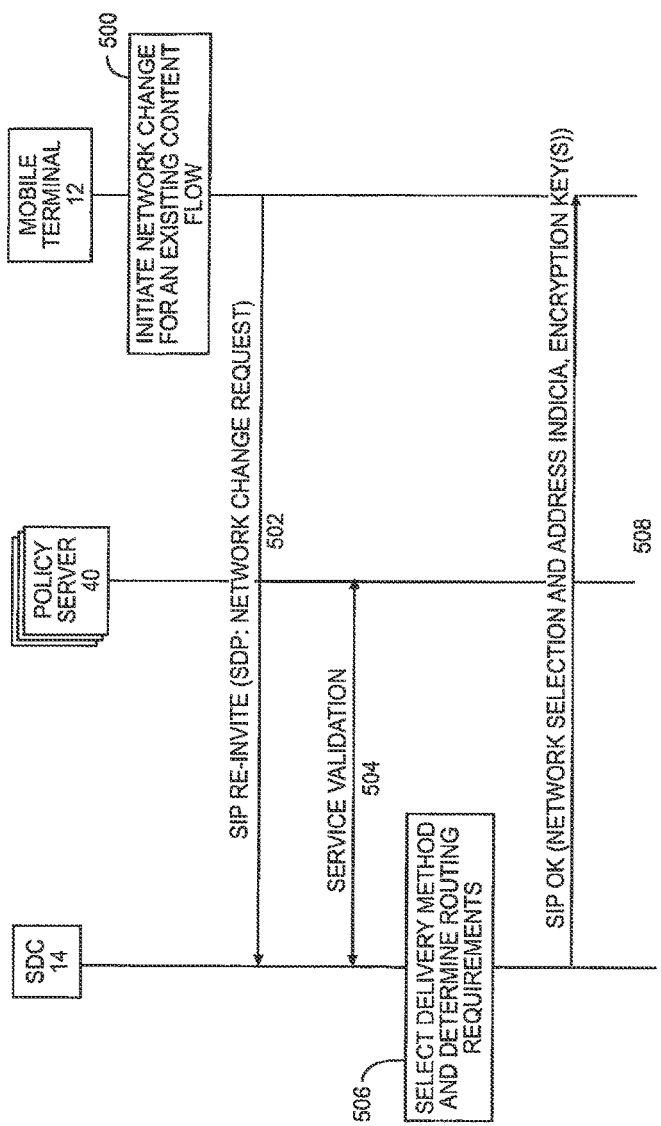

FIG. 9 is a communication flow illustrating the mobile terminal initiating a service area change according to one embodiment of the present invention.

Figure 10:
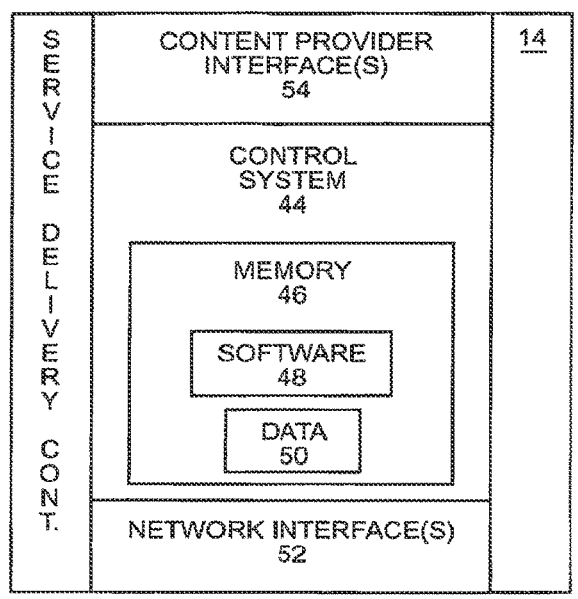

FIG. 10 is a block representation of a service delivery controller according to one embodiment of the present invention.

Figure 11:
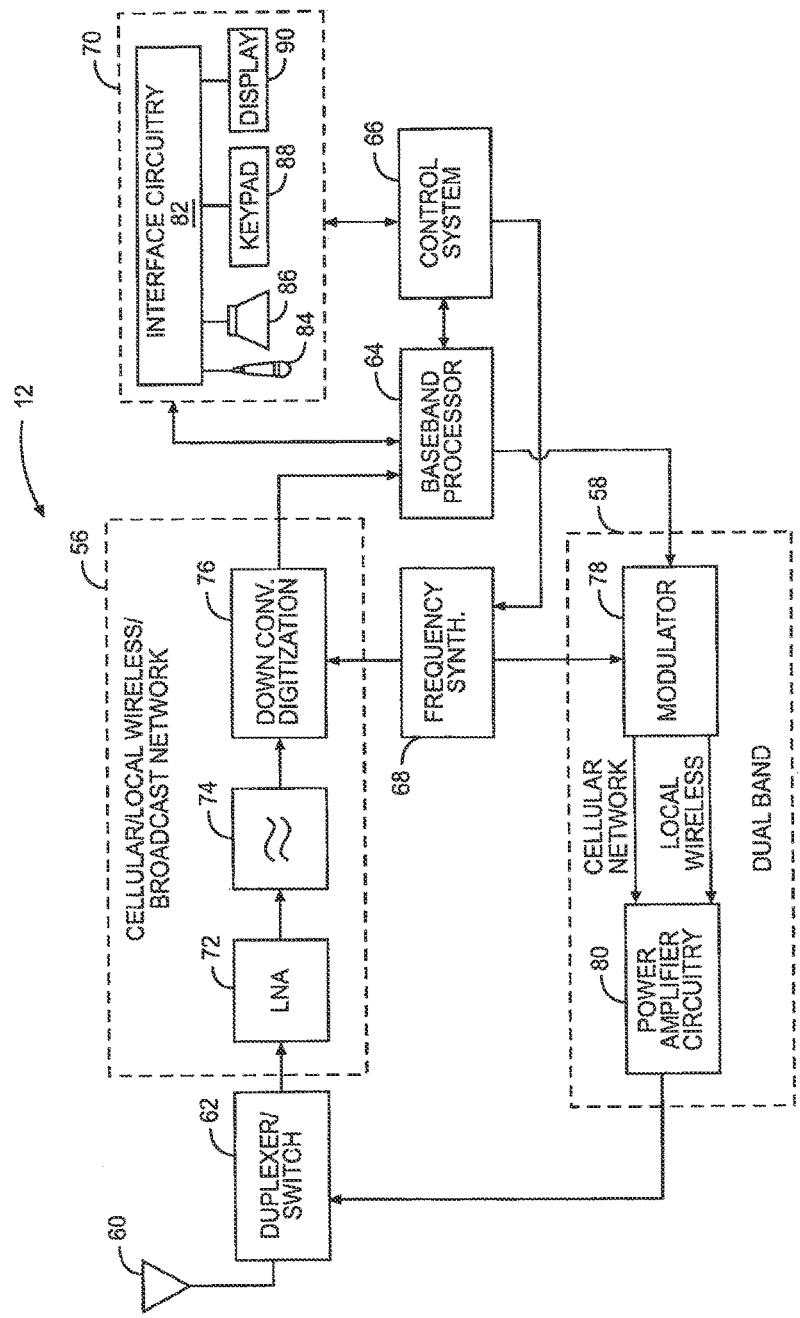

FIG. 11 is a block representation of a mobile terminal according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention facilitates delivery of content streams to mobile terminals over disparate types of access networks, such as cellular, local wireless, and broadcast networks, in an effort to minimize the resources required to deliver the content. The content streams may be delivered to the mobile terminals using unicast, multicast, or broadcast methods in each of the cellular, local wireless, or broadcast networks, or any combination thereof. In an effort to improve efficiency, content streams for multiple mobile terminals are multicast or broadcast to avoid using individual unicasts for each of the multiple mobile terminals. The invention also improves quality of service for mobile terminals in poor reception areas, and provides delivery continuity as mobile terminals roam across various coverage areas. The content streams may also be unicast or multicast only in one or more select cells or zones of the cellular and local wireless networks to further improve delivery efficiency. Accordingly, a content stream may be multicast in a broadcast network or broadcast in a cellular or local wireless network or any portion therein.

Delivery of the content streams may be transitioned from one type of network to another as the mobile terminal moves or in an effort to improve efficiency. Transitions between cells or local wireless access zones are handled by the underlying access network in traditional fashion. Further, the delivery method for a given content flow may be dynamically transitioned from one method to another. For example, as the number of mobile terminals for a given flow increases, the delivery method may be changed from unicast to multicast and vice versa. Notably, different delivery methods may be used in different networks for a given flow.

Content delivery is provided using the Internet Protocol (IP) or like network layer protocol, such that the underlying cellular, local wireless, and broadcast networks appear as a unified network. Control of the content delivery may be provided using the Session initiation Protocol (SIP), or like session control protocol, through an available cellular or local wireless network, since the broadcast network will not generally support bi-directional control signaling. As such, the underlying communication functionality of the respective networks is leveraged, while overall content delivery and control is provided using IP.

For clarity, a broadcast delivery method refers to a single point to multipoint content delivery service, where content from a sender may be received by any mobile terminal with an appropriate receiver and within a service area in which the content can be received by the mobile terminal. Again, broadcast content can be provided throughout or within select areas of the cellular, local wireless, and broadcast networks. A multicast delivery method is a single point to multipoint content delivery service, where content from a sender can be received only by a targeted group of mobile terminals with the appropriate receivers and within a service area in which the content can be received. Multicast content can be provided throughout or within select areas of the cellular, local wireless, and broadcast networks. A unicast delivery method is a single point to single point delivery service where content from the sender may be received by only one intended mobile terminal. The present invention avoids using unicast delivery methods when possible and attempts to optimize the use of multicast and broadcast delivery methods among the various types of networks to make efficient use of network resources. Prior to delving into the details of the present invention, an overview of a communication environment according to one embodiment is described.

Figure 1:
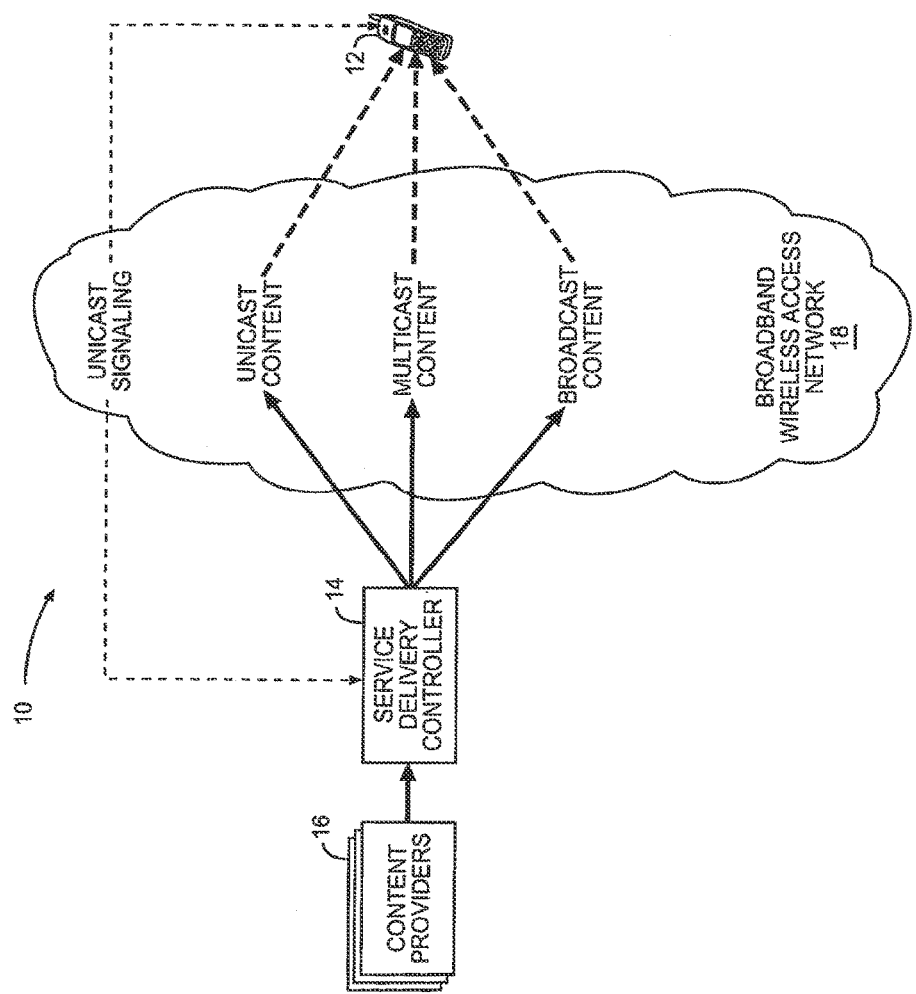
FIG. 1 is a block representation illustrating the delivery of unicast content, multicast content, and broadcast content to a mobile terminal over a broadband wireless access network.

With reference to FIG. 1, a functional representation of a communication environment 10 is illustrated. A mobile terminal 12 is configured to cooperate with a service delivery controller 14 to select content to receive from one or more content providers 16 over a broadband wireless access network 18, which will be described in further detail below. Based on various criteria, including the number of mobile terminals 12 receiving selected content or requesting to receive selected content, the service delivery controller 14 will select a service delivery method to facilitate delivery of the selected content to the illustrated mobile terminal 12, as well as any other mobile terminals 12 receiving or scheduled to receive the selected content. The service delivery controller 14 may select unicast, multicast, or broadcast delivery methods for delivering the selected content. During a given content flow, the service delivery controller 14 may coordinate with the mobile terminal 12 to dynamically change from one delivery method to another as the number of mobile terminals 12 receiving or scheduled to receive the selected content changes. As will be described further below, other conditions, such as the mobile terminal 12 changing from one network to another or from one communication zone to another, may impact the decision to transition from one delivery method to another, as well as impacting the initial delivery method to use when a content flow is initiated.

Notably, different content flows may use different delivery methods. For example, a first content flow may be unicast to a few mobile terminals 12, a second content flow may be multicast to a larger group of mobile terminals 12, and a third content flow may be broadcast such that any mobile terminal 12 with the appropriate capabilities to receive the content flow that is within communication range of the broadband wireless access network 18 will be able to receive the content flow. The content flow may correspond to different content, such as different programs, or the same content at different quality levels.

Figure 2:
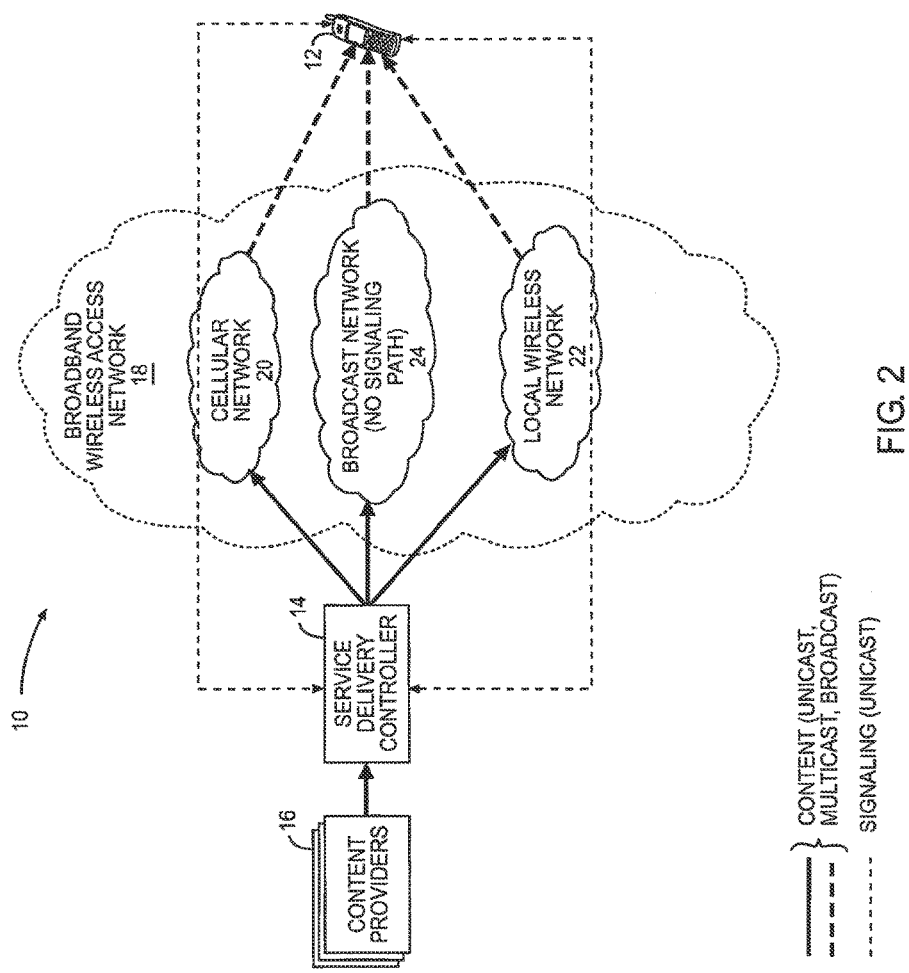
FIG. 2 is a block representation illustrating the delivery of content to a mobile terminal over a cellular network, local wireless network, and broadcast network according to one embodiment of the present invention.

With reference to FIG. 2, the broadband wireless access network 18 is formed of disparate types of networks using different network technologies to facilitate wireless communications or transmission of content. As illustrated, in one embodiment of the present invention the broadband wireless access network 18 includes a cellular network 20, a local wireless network 22, and a broadcast network 24. The service delivery controller 14 is appropriately coupled to each of these networks to facilitate the control or delivery of content to the mobile terminal 12, perhaps from the content provider 16 or from another source internal to the respective networks. Notably, the content flow may be delivered using unicast, multicast, or broadcast delivery methods through any one or all of the three networks: cellular network 20, local wireless network 22, and broadcast network 24. One aspect of the present invention allows content delivery control and content delivery to be supported on top of the existing network infrastructure, such that content may be addressed for unicast, multicast, or broadcast delivery to the mobile terminal 12 in a manner treating each of the different networks as effectively an overall broadband wireless access network 18.

The mobile terminal 12 will need to have appropriate wireless interfaces to facilitate communications over the cellular network 20, the local wireless network 22, and the broadcast network 24. During operation, the mobile terminal 12 will need to register for access with the cellular network 20 and the local wireless network 22, and be configured to receive content transmitted from the broadcast network 24. Once access to the cellular network 20 or the local wireless network 22 is provided, the mobile terminal 12 will be able to communicate with the service delivery controller 14 through either the cellular network 20 or the local wireless network 22 to allow reception of the content at the mobile terminal 12.

To deliver the selected content to the mobile terminal 12, the service delivery controller 14 needs to identify the network through which selected content will be delivered, and how to identify content when it is delivered. The service delivery controller 14 will identify the network through which the selected content will be delivered, and provide address indicia to assist the mobile terminal 12 in identifying the content being delivered. The network for delivering the content must be one through which communications with the mobile terminal 12 are currently available, and may be based on the preferences of the mobile terminal 12 or preferences of the service delivery controller 14 when multiple networks are currently available. Notably, content may be delivered throughout a network or to select zones in a network, such as cells, local wireless zones, and the like.

The address indicia provided to the mobile terminal 12 may correspond to a unicast address, a multicast address, or a broadcast address, which will be provided as a destination for the packets carrying the selected content. The mobile terminal 12 will monitor incoming packets and identify incoming packets with an appropriate address as packets corresponding to the selected content. The mobile terminal 12 need not distinguish between various types of addresses; however, the mobile terminal 12 may need to use the type of IP address to determine which radio access channel to monitor. The service delivery controller 14 may use these addresses to deliver the content according to a selected delivery method. The unicast address may be the IP address associated with the mobile terminal 12. Multicast and broadcast addresses may be dynamically provided to the various mobile terminals 12 in the respective multicast or broadcast groups. As such, one embodiment of the present invention dynamically assigns multicast and broadcast addresses to content flows and notifies participating mobile terminals 12 to facilitate the reception of content flows that are multicast or broadcast.

The signaling between the service delivery controller 14 and the mobile terminals 12 will generally be unicast signaling. As indicated above, as the mobile terminal 12 moves within a given network, such as the cellular network 20 or the local wireless network 22, network access transitions from one cell or zone to another are handled by the underlying network. However, the service delivery controller 14 may play a role in controlling what cells and zones are used for unicast, multicast, or broadcast delivery of content based on the mobile terminal's location. The service delivery controller 14 will also cooperate with the mobile terminal 12 to facilitate transitions from one network to another, such as from the cellular network 20 to the broadcast network 24, for receiving selected content. In essence, the service delivery controller 14 will establish or otherwise ensure the content flow is being provided over the new network to which the mobile terminal 12 is going to transition, and then instruct the mobile terminal 12 to transition from receiving the content flow via one network to another. Accordingly, the mobile terminal 12 may be receiving selected content over a local wireless network 22 using a unicast delivery method, and then transition to the broadcast network 24 to receive the same content flow via multicast delivery upon coming within the communication range of the broadcast network 24. In another example, numerous mobile terminal 12 receiving the same selected content as part of a multicast group may receive the selected content over different networks, wherein the selected content is multicast over the different network such that mobile terminals 12 within range of the respective network can receive the selected content.

The service delivery controller 14 may take into consideration various criteria in an effort to minimize resources necessary to deliver selected content to any number of mobile terminals 12 over all or part of one or more of the networks. An example delivery control profile is as follows:

for widely distributed content intended for a large number of mobile terminals 12, broadcast delivery via the broadcast network 24;

for content selected by a relatively large number of mobile terminals 12 or for widely dispersed mobile terminals 12, multicast content via the broadcast network 24;

for content selected by a relatively small number of mobile terminals 12, multicast delivery via the cellular network 20;

for delivery of content to mobile terminals 12 in selected areas, broadcast delivery for specific cells or local wireless zones via the cellular network 20 and local wireless network 22, respectively; and for content corresponding to a particular network, broadcast delivery through the given network to deliver the content.

Figure 3:
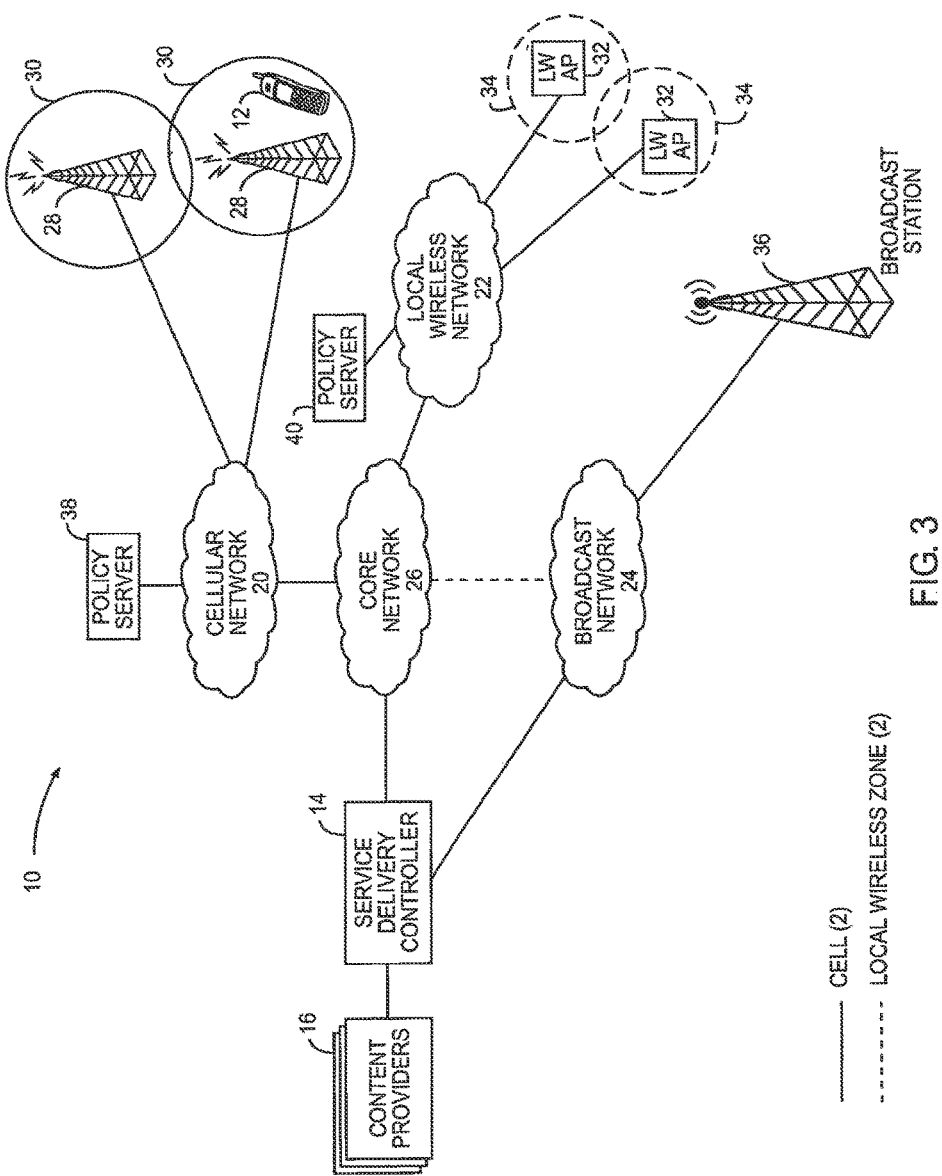
FIG. 3 is a block representation of a communication environment according to one embodiment of the present invention.

With reference to FIG. 3, the communication environment 10 is illustrated in greater detail. As illustrated, a core network 26 may be a uniform network or be formed of various networks to effectively support communications between the service delivery controller 14 and the cellular network 20, local wireless network 22, and broadcast network 24. The service delivery controller 14 may be directly associated with the broadcast network 24 or any of the other networks, or indirectly via the core network 26. The cellular network 20 is illustrated as including multiple base stations 28 forming cells or cellular zones 30 in which cellular communications with the mobile terminal 12 are possible. Similarly, the local wireless network 22 is illustrated as including multiple local wireless access points (LWAPs) 32, forming local wireless zones 34 in which local wireless communications with the mobile terminal 12 are possible. The local wireless zones 34 are generally more restricted in area than cellular zones 30, and are supported using various local wireless access technologies, such as those set forth in the IEEE's 802.11 wireless local area network standards. Those skilled in the art will recognize other available local wireless communication techniques.

Also illustrated is a broadcast station 36 associated with the broadcast network 24. The broadcast station 36 will generally cover a very broad geographic area Policy sewers 38 and 40, which are associated with the cellular network 20 and the local wireless network 22, respectively, represent the specific network entities for controlling access by the mobile terminal 12 and control the network resources made available to the mobile terminal 12 and supporting any type of communications.

Figure 4A:
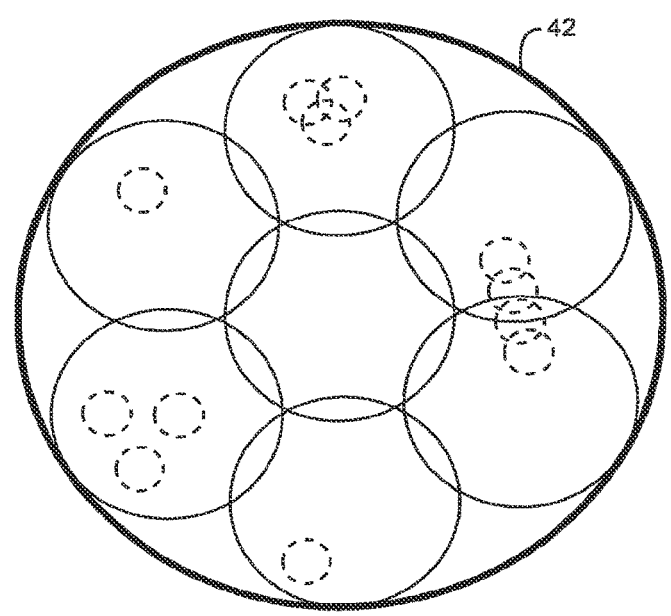
FIGS. 4A-4F illustrate various types of service areas with cellular, local wireless, and broadcast networks for a given area and selectively delivering content to all or different portions of the given area using the different service areas provided by the cellular, local wireless, and broadcast networks.

With reference to FIG. 4A, an exemplary relationship between cellular zones 30, local wireless zones 34, and a broadcast zone 42 is illustrated. As is generally the case, the broadcast zone 42 provides fairly comprehensive coverage over a wide geographic area, wherein the cellular zones 30 each provide cellular coverage over a smaller geographic area. Multiple cellular zones 30 are configured to overlap one another to provide consistent coverage for the overall cellular network 20, wherein as the mobile terminal 12 moves from one cellular zone 30 to another, a handoff is required from one base station 28 to another. The local wireless zones 34 are generally significantly smaller than the cellular zones 30, and have traditionally provided less continuous coverage over any given area. Oftentimes, the local wireless zones 34 are relatively isolated from one another; however, clusters of local wireless access points 32 may be placed to provide contiguous local wireless zones over a given area.

Figure 4B:
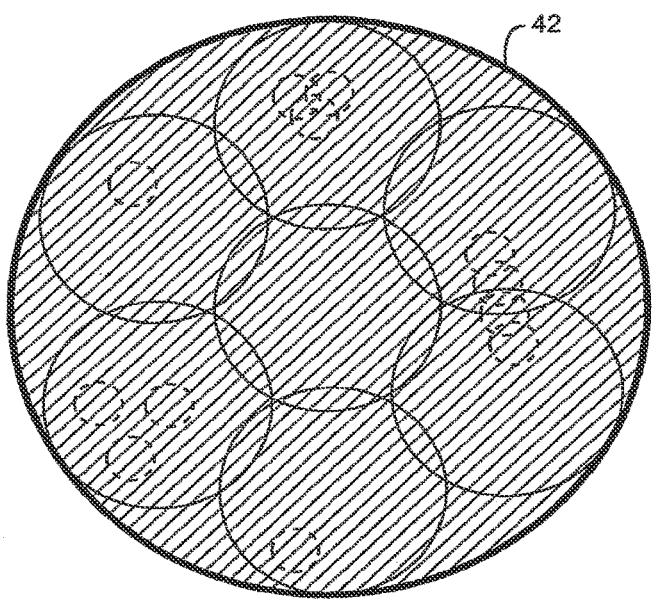
Figure 4C:
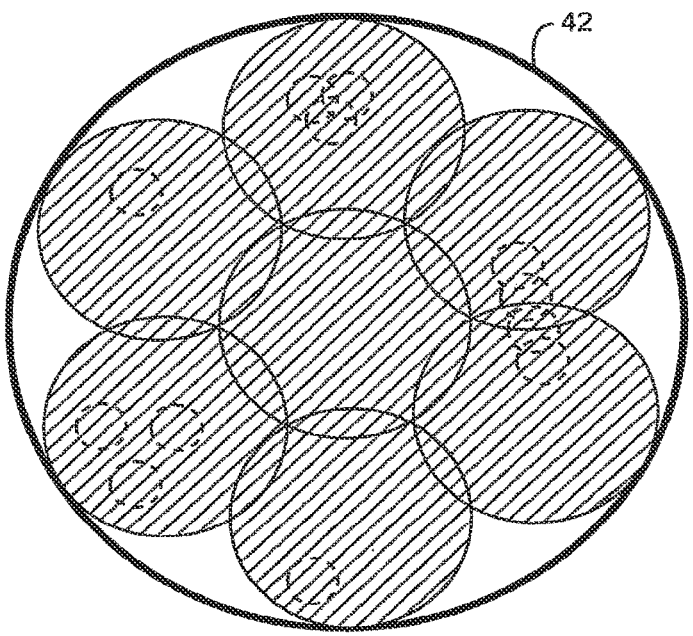
Figure 4D:
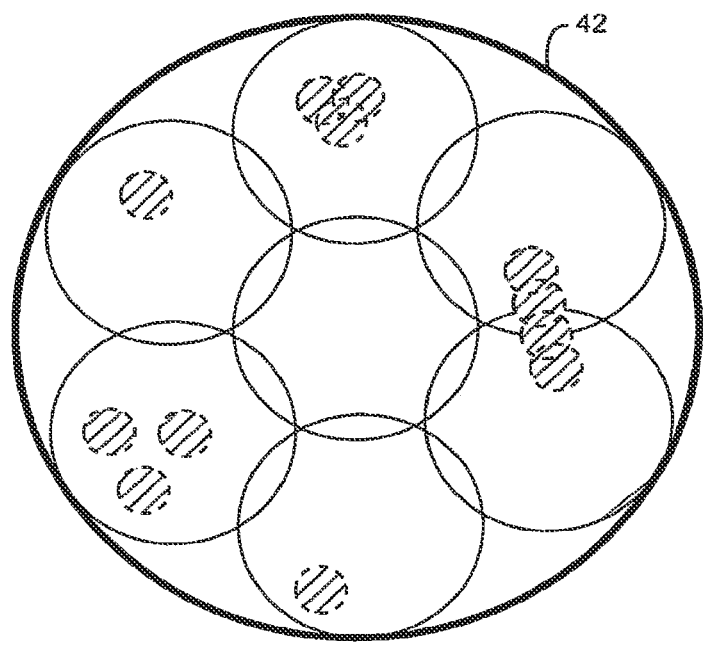
Figure 4E:
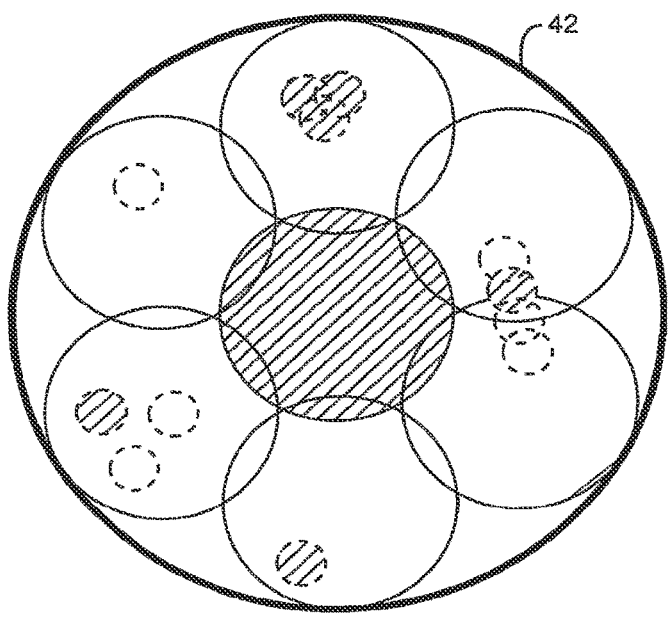
Figure 4F:
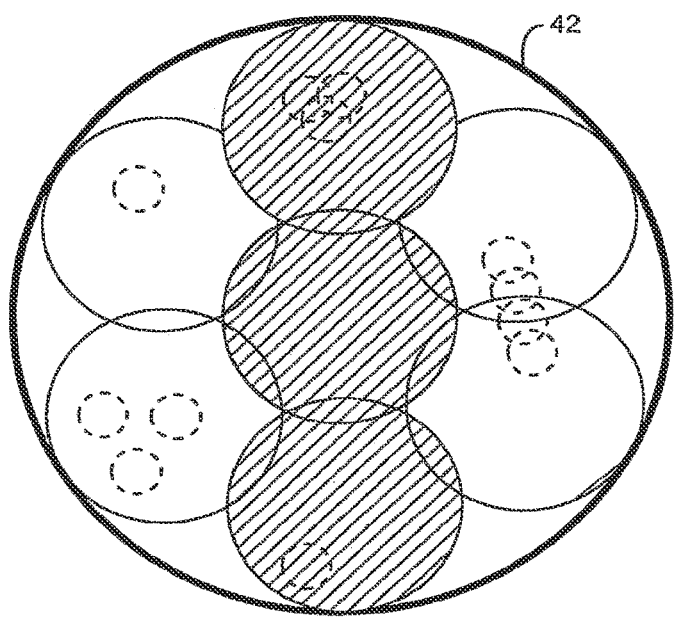

FIG. 4B illustrates the potential delivery area for the broadcast network 24. FIG. 4C illustrates the potential delivery area for the entire cellular network 20. FIG. 4D illustrates the potential delivery area for the available local wireless zones 34. FIG. 4E illustrates the delivery area when the central cellular zone 30 and certain local wireless zones 34 are selected. FIG. 4F illustrates the potential delivery area when three cellular zones 30 are selected. FIGS. 4B-4F illustrate the limitless ways in which content may be delivered using unicast, multicast, or broadcast delivery techniques for entire networks, portions of networks, or any combination thereof.

For the present invention, the service delivery controller 14 must determine the delivery method for a given content flow and a delivery area for the content flow to enable mobile terminals 12 that requested the content to be able to receive the content. Since the delivery area must be within a service area of one of the cellular network 20, broadcast network 24, and local wireless network 22, the service delivery controller 14 must select one of the networks, apportion one of the networks, or a combination thereof, for delivery of the content. Different address indicia will be created for different delivery methods as described above. The service delivery controller 14 will arrange for or actually deliver the content to the designated delivery areas. In addition, the service delivery controller 14 must provide the mobile terminal 12 with the multicast or broadcast address indicia for the selected content, such that the mobile terminal 12 can use the address indicia for identifying content intended to be delivered to the mobile terminal 12. The service delivery controller 14 will also provide network indicia identifying the network through which the selected content will be delivered. From the network indicia, the mobile terminal 12 will be able to activate the appropriate cellular, local wireless, or broadcast network interface to receive the content.

To determine a delivery method for a given content flow and select a network and perhaps delivery area within a network to use for delivering the content, several criteria may be used. Certain criteria may only be used to select the delivery mode or used only to select the network or delivery area within the network through which the content is delivered. In other embodiments, certain criteria may be used to aid in determining both the delivery mode and the network or delivery area within the network.

Selecting the network or delivery area within a network for delivering the selected content is referred to as a content routing decision. The content routing decision may be based on various capabilities of the mobile terminals 12 to which the content should be delivered based on a specific request, or simply delivered in general, such as may be the case for certain television programming. The mobile terminal capabilities in general relate to either the physical configuration of the mobile terminal 12, or its relative location with respect to being able to receive communications from one or more of the available networks. A physical capability may relate to the available communication interfaces for the mobile terminal 12, whether these interfaces are active, and whether these interfaces are actually capable of receiving communications from a particular network. The latter capability may be considered related to the relative location of the mobile terminal 12, and that the ability to receive communications from a given network or associated communication zone is indicative of the mobile terminal's location.

Other capabilities may include the mobile terminal's display size and its ability to process streaming content. Different mobile terminals 12 may have different capabilities or service agreements dictating the quality of the content. For example, certain mobile terminals 12 may only be able to receive or subscribe to receive highly compressed, low-resolution television signals, whereas other mobile terminals 12 may be able to receive standard definition content. Other mobile terminals 12 may be able to receive high-definition content. Based on these different physical capabilities, the same content may be delivered to different groups of mobile terminals 12 at different resolutions or quality of service levels, wherein there are different flows for the different resolutions. Each resolution may be multicast to a corresponding address, which was previously provided by the service delivery controller 14 to the respective mobile terminals 12.

As indicated, the location indicia may bear on the mobile terminal's current ability to receive communications from a given network or service area within a network, which may correspond to a cellular zone 30 or local wireless zone 34. Actual location information may be derived from Global Positioning System (GPS) receivers integrated with the mobile terminal 12, or by using information derived from the various networks or triangulated by the mobile terminal 12.

Routing decisions may also be based on the type of content being requested, as well as the number of mobile terminals 12 that have requested the selected content. The number of mobile terminals 12 may related to overall numbers, or concentrations in particular areas. Accordingly, geographic distribution and concentrations may factor into the routing decision and may be considered related to relative locations of each of the mobile terminals 12.

All of the above criteria may also impact the delivery method selection. Of particular benefit in selecting the delivery method is the number of mobile terminals 12 that have requested or that are receiving certain content in general, or at various locations. In one embodiment, the routing and delivery method decisions are a function of a variety of criteria, wherein different criteria may weigh more heavily on either the routing decision or the delivery method decision. Those skilled in the art will recognize that weighting and use of the various criteria are a service provider's or network operator's choice, and will be based on the optimization goals, capabilities, and limitations for the networks, content, and mobile terminals 12 involved.

With reference to FIGS. 5A and 5B, a flow diagram is provided to illustrate the operation of the service delivery controller 14 according to one embodiment of the present invention. For a given mobile terminal 12, the service delivery controller 14 will receive a registration request to register for the content delivery service (step 100). At this point, the mobile terminal 12 will already have registered with the supporting access network, and will have rights and privileges sufficient to allow communications with the service delivery controller 14. The registration request may include capabilities for the mobile terminal 12. These mobile terminal capabilities may be used by the service delivery controller 14 to make routing and delivery method selection decisions. The service delivery controller 14 will register the mobile terminal 12 with the content delivery service (step 102), and perhaps provide an electronic service guide to the mobile terminal 12 (step 104). The electronic service guide may be provided to the mobile terminal 12 as content, or in the form of a uniform resource indicator (URI), which points to a server from which the electronic service guide may be retrieved. The mobile terminal 12 will be able to display the electronic service guide to its user and receive a selection from the guide. The selection corresponds to a desired content that the user has requested to be delivered to the mobile terminal 12 for viewing or the like. The guide may be customized to the capabilities of the mobile terminal 12, preferences of the subscriber, subscription (service level agreement) currently in force for this subscriber, capabilities of the delivery network, or any combination thereof.

The mobile terminal 12 will then send the content selection information to the service delivery controller 14, which will receive the content selection information (step 106). Based on the content selection information, the service delivery controller 14 may need to validate the selection in light of various service level agreements (step 108). A first agreement may relate to the resource capabilities to which the mobile terminal 12 is subscribed with the various access networks. Another service level agreement may be the actual content service level agreement, which dictates the type of content and content quality that can be delivered to the mobile terminal 12. Alternatively, a customized guide may only include content that the subscriber is allowed to access.

At this point, the service delivery controller 14 has the mobile terminal's content request and, also has information pertaining to other mobile terminals 12 that may already be receiving corresponding content, or wish to receive corresponding content (step 110). The service delivery controller 14 will then select service areas for routing the selected content flow (step 112). Again, the service areas may correspond to entire networks, cellular zones 30, local wireless zones 34, or any number or combination thereof. See FIGS. 4B-4F for examples. The service delivery controller 14 will also select the delivery method or methods for delivering the content flow to the selected service areas (step 114).

In one embodiment, the primary criteria for determining the delivery method is substantially based on the number of mobile terminals 12 requesting the selected content and that are currently receiving the selected content:

- when the number of mobile terminals 12 in a given network b is less than $N_b$, use unicast delivery for each mobile terminal 12, wherein replicated content flows are provided for each mobile terminal 12;
- when the number of mobile terminals 12 is greater than $N_b$, use multicast delivery for the mobile terminals 12, wherein one or more multicast content flows may be provided for one or more groups of mobile terminals 12; and
- when essentially all of the mobile terminals 12 should receive the content flow, use broadcast delivery for the content.

The above delivery method selection criteria is provided for explanation only, but the same or similar criteria may be applied for all the mobile terminals 12 for a given content flow, regardless of network, or on a network-by-network or zone-by-zone basis, wherein different delivery methods are selected for different networks or portions thereof at the same time for a given content flow.

Based on the routing and delivery method decisions, the service delivery controller 14 will then assign network selection and address indicia for the mobile terminal 12 and any other mobile terminals 12 that are requesting information or need an update when such information is changed (step 116). The service delivery controller 14 will then deliver content flow having the assigned address indicia to the selected service areas, which have now become delivery areas, using the selected delivery methods (step 118). Again, multiple flows may be required to service all of the mobile terminals 12 in the various delivery areas. The service delivery controller 14 will then send a network selection and address indicia to the mobile terminal 12 and any other mobile terminals 12 that need the information (step 120).

At this point, the mobile terminals 12 can begin or continue receiving the content. During operation, the mobile terminal 12 may continue to monitor and report its capabilities to the service delivery controller 14, which will be receiving capabilities updates from various mobile terminals 12 (step 122). Accordingly, the service delivery controller 14 can reevaluate the routing delivery method decisions, and if changes are necessary, generate and deliver the requisite network selection address indicia to the affected mobile terminals 12. If multicasting or broadcasting for a given flow is provided over two networks, the mobile terminal 12 changing from one network to another will only require an update of network indicia, which will trigger the mobile terminal 12 to simply start receiving the content through the new network using the same address indicia. If the content flow is not already established over the new network, the service delivery controller 14 will need to take the necessary steps to start routing the content to the selected area through the new network. If multicasting is maintained, the same address indicia may be used. Otherwise, the mobile terminal 12 may be instructed to use its IP address where unicasting is used to deliver content to the mobile terminal 12 through the new network. If the delivery method changes in a given network, the mobile terminal 12 will be updated with appropriate address indicia corresponding to the new delivery mode. As such, the delivery mode may be changed, such as changing from multicasting to unicasting, and vice versa.

Accordingly, the routing and delivery methods for a given content flow may be re-optimized based on changes in mobile terminal capabilities and the number of mobile terminals 12 to receive the content flow. These changes may be triggered by the mobile terminals 12, or by the service delivery controller 14. For example, upon receiving a request from a mobile terminal 12 to receive a content flow over a different network, the service delivery controller 14 may respond as follows. If the new network is already supporting the content flow using a multicast or broadcast delivery method, the service delivery controller 14 will inform the mobile terminal 12 that the content flow is afforded using the existing address indicia, and make note that the mobile terminal 12 is now receiving the content from the new network and remains part of the multicast or broadcast group of mobile terminals 12. If the new network is not currently supporting the content flow, the service delivery controller 14 will initiate the content flow in the new network, and provide the mobile terminal 12 with appropriate address indicia or indicate that the current address indicia is still valid, assuming that the new content flow is established for the same multicast or broadcast delivery method.

A change in the number of mobile terminals 12 associated with a given content flow may initiate a change in the delivery method for the content flow. When the delivery method is changed, the service delivery controller 14 may operate as follows. If the number of mobile terminals 12 receiving the content flow via unicast delivery goes above $N_b$, the service delivery controller 14 may establish a multicast content flow in the current network and then migrate the affected mobile terminals 12 to the multicast content flow. If the number of mobile terminals 12 receiving the multicast content flow subsequently falls below $N_b-K_b$, where $K_b<N_b$, the service delivery controller 14 will systematically establish unicast content flows for each of the mobile terminals 12 and migrate the mobile terminals 12 to the respective unicast content flows.

With reference to FIG. 6A, an illustration of the operation of the mobile terminal 12 is provided according to one embodiment. Initially, the mobile terminal 12 will register with the available access networks, such as the cellular network 20 or the local wireless network 22 in traditional fashion (step 200). The mobile terminal 12 will then communicate through one of the active cellular or local wireless networks 20, 22 to register with the service delivery controller 14 (step 202). During the registration process, the mobile terminal 12 may provide its capabilities, including any location information. With the present invention, only one registration effort is required to register with the service delivery controller 14, regardless of whether local wireless or cellular access is used to support registration. The mobile terminal 12 will then receive an electronic service guide or a URI for an electronic service guide from the service delivery controller 14 (step 204). If necessary, the guide is retrieved using the URI, and then provided to the user. During this time, the mobile terminal 12 may systematically or periodically update the service delivery controller 14 with its capabilities (step 206).

Upon receiving user input responding to a content selection from the electronic service guide, the mobile terminal 12 will provide content selection information corresponding to the selected content to the service delivery controller 14 (step 208). The mobile terminal 12 will then receive the network selection indicia, address indicia, and decoding information for receiving content flaw for the content selection (step 210). The mobile terminal 12 will begin receiving the content flow using the address indicia via the network interface corresponding to the network selection indicia (step 212). As such, the mobile terminal 12 may use the network selection indicia to activate or use its cellular interface, local wireless interface, or broadcast network interface to receive the content flow. Again, the content flow will be addressed with or will otherwise be associated with the address indicia. For unicast content, the address indicia may be the IP address for the mobile terminal 12. For multicast or broadcast delivery, the address indicia will include an address or other identifier for identifying the content flow as being that corresponding to the selected content. Decoding information may include keys for deciphering the content, the codec to be used for interpreting the content, and the like.

During this time, the mobile terminal 12 may systematically provide capabilities updates to the service delivery controller 14 or on an as needed basis (step 214). The mobile terminal 12 will recognize receipt of any new network selection or address indicia (step 216). If new network selection or address indicia is received, the mobile terminal 12 will transition to the new network interface, the new address indicia, or a combination thereof for receiving the content flow (step 218). If there is no new network selection or address indicia (step 216), the mobile terminal 12 will continue receiving the content flow using the current address indicia and the current network interface, and will provide mobile terminal capability updates as needed on a systematic basis.

With reference to FIG. 7, a communication flow diagram is provided to illustrate the registration and content selection process according to one embodiment of the present invention. The mobile terminal 12 will initiate a Service Registration after registering with one or more access networks (step 300). In this embodiment, the mobile terminal 12 and the service delivery controller (SDC) 14 use SIP for signaling and take advantage of the Session Description Protocol (SDP) for carrying various types of information, such as the mobile terminal capabilities, the network selection and address indicia, and the like. Accordingly, the mobile terminal 12 will send a SIP Register message, including the mobile terminal capabilities in the SDP field, to the service delivery controller 14 (step 302). The service delivery controller 14 will register the mobile terminal 12 (step 304) and provide a SIP OK message back to the mobile terminal 12 (step 306). The SIP OK message may include the electronic service guide (ESG) URI in the SDP field.

The mobile terminal 12 will then use the ESG URI to access the electronic service guide and present it to the user (step 308). The mobile terminal 12 will recognize the user selecting certain content, such as a television program (step 310), and send a SIP Invite message identifying the content selection to the service delivery controller 14 (step 312). The SIP Invite message may include updated mobile terminal capabilities in the SDP field. The service delivery controller 14 may then interact with various policy servers, such as the policy server 38 for the cellular network 20, to effect a service validation, making sure that the underlying access network will provide the resources necessary for the requested content (step 314). The service delivery controller 14 may also ensure that the service level agreement at the content service provider is such that the requested content can be delivered to the mobile terminal 12. The service delivery controller 14 will then select or otherwise determine the delivery method and determine routing requirements as discussed above (step 316). This will result in network selection and address indicia for the mobile terminal 12.

Accordingly, the service delivery controller 14 will respond to the SIP invite by providing a SIP OK message to the mobile terminal 12 (step 318). The SIP OK message may include the network selection and address indicia for the content selection. Other information may be provided, such as the required keys for decrypting the content of the content flow. At this point, the service delivery controller 14 will effect delivery of the content to the mobile terminal 12 as appropriate, and the mobile terminal 12 will use the address indicia and the decryption key to recover the transmitted content via the network as dictated by the network selection indicia.

With reference to FIG. 8, a basic communication flow is illustrated wherein the service delivery controller 14 assigns a new network selection or address indicia. Initially, the service delivery controller 14 will determine that there is a need for new network selection or address indicia for a given mobile terminal 12 in association with a content flow. The service delivery controller 14 will assign new network selection or address indicia for the mobile terminal 12 (step 400) and will send a SIP Re-Invite message to the mobile terminal 12 (step 402). The SIP Re-Invite message will include the new network selection or address indicia in the SDP field. The mobile terminal 12 will receive the network selection or address indicia and transition to receiving the content flow via a different network interface based on the network selection indicia, or use a different address to receive the content flow based on the address indicia (step 404). The mobile terminal 12 will send a SIP OK message to the service delivery controller 14 to indicate that the transition has taken place (step 406).

With reference to FIG. 9, a communication flow is provided for a mobile terminal 12 requesting a network change during a content flow. Accordingly, the mobile terminal 12 will initiate a network change for an existing content flow (step 500). The mobile terminal 12 will send a SIP Re-Invite message indicating that a network change request is being made to the service delivery controller 14 (step 502), which will provide service validations for the access network as well as for the content delivery (step 504). Assuming the service validation is approved, the service delivery controller 14 will select a delivery method, if necessary, and determine any routing requirements in light of the request to change network by the mobile terminal 12 (step 506). The service delivery controller 14 will then send a SIP OK message to the mobile terminal 12 (step 508). The SIP OK message may include any requisite network selection and address indicia, as well as any necessary decryption keys to facilitate reception of the content flow via another network flow by the mobile terminal 12. During this process, the service delivery controller 14 will make sure that the content flow is being provided via the new network using the address indicia that was provided to the mobile terminal 12. Again, the address indicia may not have changed from the previous content flow, and thus may not need to be included in the SIP OK message.

Migration between unicast, multicast, or broadcast flows, as well as from one network to another, may be linked in certain instances. In one embodiment, such migration is enhanced by implementing a make-before-break migration technique. For example, a session may be migrated from unicast to multicast within a given cell. In this case, session migration does not require a corresponding hand-over function. The multicast session is initially set up in parallel with the unicast session. Once the mobile terminal 12 signals that it is receiving the content flow for the multicast session, the unicast session may be ended. If the migration involves a network change, an inter-network hand-over is required in association with the transfer from one network to another. Again, implementing a make-before-break handover will enable a more seamless migration from one network to another. For example, when migrating from a wireless LAN or cellular unicast session to a broadcast network multicast session, the mobile terminal 12 may, for some period of time, receive the content flow from the wireless LAN or cellular interface and the broadcast interface simultaneously. The mobile terminal 12 will coordinate with the service delivery controller 14 to terminate the unicast flow once the broadcast network transmission is being properly received. Migration from one cell to another or from one local wireless zone to another within a given network is handled by the respective access network. Once an intra-network hand-over is completed, the mobile terminal 12 may update the service delivery controller 14 with its new cell or local wireless zone identification. The service delivery controller 14 can use this new information in an effort to optimize ongoing and future sessions.

Turning now to FIG. 10, a block representation of a service delivery controller 14 is provided. The service delivery controller 14 may include a control system 44 having the requisite memory 46 for the software 48 and data 50 required to facilitate operation as described above. The control system 44 may be associated with network interfaces 52 as well as content provider interfaces 54. The network interfaces 52 will provide direct or indirect connections to the core network 26, cellular network 20, local wireless network 22, and broadcast network 24. The content provider interfaces 54 may be one of the network interfaces or a separate interface, directly or indirectly coupled to content servers provided by the content providers 16. The control system 44 will operate under the control of the software 48 to provide the functionalities described above. In addition, the control system 44 may support various data aggregation, compression, coding, encryption, and like processing to facilitate delivery of the content flows to the mobile terminals 12 in an appropriate fashion. Those skilled in the art will recognize that the service delivery controller 14 may be implemented in a single entity, or its functionality may be distributed among multiple entities.

The basic architecture of the mobile terminal 12 is represented in FIG. 11 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by base stations 28, local wireless access points 32, or broadcast stations 36 to provide cellular, local wireless, and broadcast network interfaces. Such reception may take place relatively concurrently or at different times. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the content conveyed in the received signal. This processing typically comprises demodulation, decoding, and error correction operations. As such, the baseband processor 64 is generally implemented in one or more digital signal processors (DSPs). The receiver front end 56 and baseband processor 64 may also monitor various parameters associated with or included in received signals to provide capabilities, which may be reported to the service delivery controller 14. For example, information bearing on available networks, signal strengths, relative location, and the like may be gathered from the received signals.

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

As noted above, the mobile terminal 12 must be able to communicate over the cellular network 20 and the local wireless network 22. Accordingly, the receiver front end 56, baseband processor 64, and radio frequency transmitter section 58 cooperate to support the cellular and local wireless interfaces. These functions may be implemented using redundant circuitry, or by configuring common circuitry to operate in different modes. The configuration of the mobile terminal 12 will be dictated by economics and designer choice. The mobile terminal 12 could have both the local wireless interface and the cellular interface active at different times or at the same time and select one of the communication interfaces at any given time based on signal quality or other factors, such as instructions from the service delivery controller 14.

A user may interact with the mobile terminal 12 via the interface 70, which may include interface circuitry 82 associated with a microphone 84, a speaker 86, a keypad 88, and a display 90. Content received via any of the interfaces may be provided to the user via the speaker 86 and display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 12, input numbers to be dialed, address book information, or the like, as well as monitor call progress information.

As indicated, the mobile terminal 12 may take various forms; however, in operation the mobile terminal 12 may be able to operate in a single or multi-mode configuration, wherein either one or multiple communication sessions may be facilitated at the same or different times. As such, the mobile terminal 12 may be configured to simultaneously maintain different active connections on multiple wireless access networks of the same or different types. When such capability is provided, the transition from the first to the second connection for select content delivery may be maintained on the first connection until the second connection is established. In one embodiment, the mobile terminal 12 will support an Internet Protocol based signaling client to communicate with the service delivery controller 14. In operation, the mobile terminal 12 may facilitate cell or local wireless zone selection without impacting the operation of the present invention.

Those skilled in the art will recognize improvements and modifications to the preferred embodiments of the present invention. All such improvements and modifications are considered within the scope of the concepts disclosed herein and the claims that follow.

What is claimed is:

1. A method for selectively delivering content over disparate networks comprising:
    receiving mobile terminal capabilities for a first mobile terminal and a second mobile terminal, wherein the mobile terminal capabilities for the first mobile terminal and the second mobile terminal comprise display resolution capabilities for the first mobile terminal and the second mobile terminal;
    determining at least one service area to deliver content for reception by the first mobile terminal and the second mobile terminal, wherein the at least one service area is determined based on at least in part on the display resolution capabilities for the first mobile terminal and the second mobile terminal;
    selecting, from a plurality of delivery methods, a first delivery method to use for delivering the content to the first mobile terminal, the plurality of delivery methods including unicast, multicast, and broadcast;
    selecting, from the plurality of delivery methods, a second delivery method to use for delivering the content to a second mobile terminal, wherein the second delivery method is different than the first delivery method;
    selecting a network type from a plurality of network types including a cellular network, a local area network, and a broadcast network;
    sending network selection indicia and address indicia to the first mobile terminal, the network selection indicia indicating the selected network type that is used to deliver the content to the first mobile terminal, and the address indicia indicating an address to use for receiving the content; and
    effecting delivery of the content to the first mobile terminal in the at least one service area using the selected network type and the address.

2. The method of claim 1 wherein the content is selectively delivered to the at least one service area over the broadcast network and at least one of the cellular network or the local area network.

3. The method of claim 2 wherein the at least one service area corresponds to a broadcast network zone provided by the broadcast network.

4. The method of claim 2 wherein the at least one service area corresponds to at least one of the group consisting of at least the cellular network, one cellular zone, the local area network, and at least one local wireless zone.

5. The method of claim 1 wherein the content is delivered to a plurality of mobile terminals and the network selection indicia and address indicia are sent to each of the mobile terminals to receive the content.

6. The method of claim 5 wherein different service areas are determined for different ones of the plurality of mobile terminals, and the content is delivered to the different service areas.

7. The method of claim 6 wherein at least two of the different service areas correspond to different ones of the disparate networks.

8. The method of claim 6 wherein the content is delivered to the different service areas using different delivery methods.

9. The method of claim 5 wherein the content is delivered to different ones of the mobile terminals using different content flows, each content flow having a different quality of service.

10. The method of claim 1 wherein depending on a location of the first mobile terminal, the at least one service area is selected from a plurality of service areas provided by the cellular network, the local area network, or the broadcast network, the first mobile terminal having a cellular interface, local wireless interface, and a broadcast interface through which to receive the content based on the at least one service area selected.

11. The method of claim 1 wherein the address indicia for unicast corresponds to an Internet Protocol address.

12. The method of claim 1 further comprising assigning an address for multicast or broadcast delivery of the content, and wherein the address indicia for multicast and broadcast delivery comprises the address and the content is sent with the address.

13. The method of claim 1 wherein the first delivery method selected is based on a number of mobile terminals to which the content is being or will be delivered.

14. The method of claim 1 wherein delivery methods for different service areas are selected based on a number of mobile terminals to which the content is being or will be delivered in the different service areas.

15. The method of claim 1, further comprising determining a number of mobile terminals receiving or to receive the content and determining the at least one service area based on the number of mobile terminals receiving or to receive the content.

16. The method of claim 1, wherein the mobile terminal capabilities bear on an ability to communicate with the disparate networks.

17. The method of claim 1, wherein the mobile terminal capabilities indicate a configuration of the first or the second mobile terminal.

* * * * *